(12) United States Patent
Moore et al.

(10) Patent No.: US 7,132,915 B2
(45) Date of Patent: Nov. 7, 2006

(54) FERRITE ASSEMBLY

(75) Inventors: Christopher Todd Moore, Troutville, VA (US); Howard Ross Edmunds, Roanoke, VA (US); Brian Matthew Aiken, Roanoke, VA (US); Christopher James McMenamin, Salem, VA (US)

(73) Assignee: General Electric Company, Schenectady, NY (US)

( * ) Notice: Subject to any disclaimer, the term of this patent is extended or adjusted under 35 U.S.C. 154(b) by 466 days.

(21) Appl. No.: 10/685,861

(22) Filed: Oct. 15, 2003

(65) Prior Publication Data

US 2005/0081369 A1   Apr. 21, 2005

(51) Int. Cl.
*H01F 27/08* (2006.01)
(52) U.S. Cl. ........................................................ 336/55
(58) Field of Classification Search ............ 336/55–62, 336/65, 83, 174–175, 192, 212, 229
See application file for complete search history.

(56) References Cited

U.S. PATENT DOCUMENTS

| | | | | |
|---|---|---|---|---|
| 2,915,707 A | * | 12/1959 | Bradstock et al. | 324/127 |
| 4,399,395 A | | 8/1983 | Espelage | |
| 4,492,919 A | * | 1/1985 | Milkovic | 324/127 |
| 4,835,463 A | * | 5/1989 | Baran et al. | 324/123 R |
| 4,939,451 A | * | 7/1990 | Baran et al. | 324/127 |
| 6,114,847 A | * | 9/2000 | Johnson | 324/127 |

* cited by examiner

*Primary Examiner*—Tuyen T Nguyen
(74) *Attorney, Agent, or Firm*—Ohlandt, Greeley, Ruggiero & Perle, L.L.P.

(57) ABSTRACT

A ferrite assembly has a first conductor and a number of ferrite members. Each of the number of ferrite members has a core. The ferrite members are in electrical communication with the first conductor. The ferrite assembly has a number of current dividing members in electrical communication with the first conductor. The current dividing members define a number of passages for allowing an airflow therethrough.

20 Claims, 4 Drawing Sheets

FERRITE ASSEMBLY

BACKGROUND OF INVENTION

1. Field of the Invention

The present disclosure relates to a power conversion system that supplies an electrical load from a current source by a power bus bar. More particularly, the present disclosure relates to a ferrite assembly.

2. Description of the Related Art

A polyphase alternating current source is known in the art. A known problem that exists is excessive heat is generated by the polyphase alternating current that traverses through a converter via a power bus bar. This occurs, in one instance, during high current fluxes during device switching as can occur with currents in a range that includes 3100 amps at 1300 volts. This relatively high current level can potentially cause unacceptable power bus bar temperature levels. Another known problem is the current traversing through the power bus bar per unit time generates a magnetic field. This magnetic field may disrupt electrical components that are proximate to the power bus bar.

This high temperature level of the power bus bar was dealt with in the art by increasing a length of the power bus bar and also increasing a length of a ferrite assembly being disposed adjacent to the power bus bar that has the increased length. This increased length of both the power bus bar and the ferrite assembly, although effective at dissipating heat and effective in reducing the detriments of magnetic field causes a number of problems.

First of all, the increased length of the power bus bar, for any linear dimension of the power bus bar, causes the power bus bar to not fit in certain applications such as in a cabinet. Secondly, the increased length will increase design and manufacturing costs associated with the forming of the power bus bar for applications that require a predetermined amount of current. This in turn results in forming another sized ferrite assembly having an increased length to correspond with the dimensions of the formed power bus bar. Additionally, when manufacturing these components there will be higher material costs associated with the increased dimensions. This results in decreased productivity and an increased overall cost of the power bus bar and the ferrite assembly due to the additional materials.

Thus, there is a need in the art for a ferrite assembly that is compact and overcomes one or more of these deficiencies.

BRIEF DESCRIPTION OF THE INVENTION

A ferrite assembly is provided. The ferrite assembly has a first conductor and a plurality of ferrite members each having a core and being in electrical communication with the first conductor. The ferrite assembly has a plurality of current dividing members in electrical communication with the first conductor. The plurality of current dividing members defines a plurality of passages allowing an airflow therethrough.

A ferrite assembly is provided. The ferrite assembly has a first conduit having a first longitudinal axis, a first ferrite member and a second ferrite member surrounding the first conduit about the first longitudinal axis. The ferrite assembly also has a second conduit being disposed parallel to a first side of the first conduit and a first spacer material.

The first spacer material places the first and second conduits in electrical communication so that a first aperture is defined therebetween. The ferrite assembly has a third conduit being disposed parallel to a second side of said first conduit and a second spacer material placing the first and the third conduits in electrical communication so that a second aperture is defined therebetween. A current traversing through the first conduit communicates with the second conduit, the first spacer material, and the third conduit so that the first and the second apertures define a cooling path.

In another embodiment of the present disclosure a ferrite assembly is provided. The ferrite assembly has a first conduit having a first end and a second end. The ferrite assembly further has a plurality of ferrite member each having a core. The plurality of ferrite member are in electrical communication with the first conduit. The first conduit has a shape and a linear length. The linear length is longer than a distance between the first end and the second end.

DETAILED DESCRIPTION OF THE INVENTION

Figure 1:
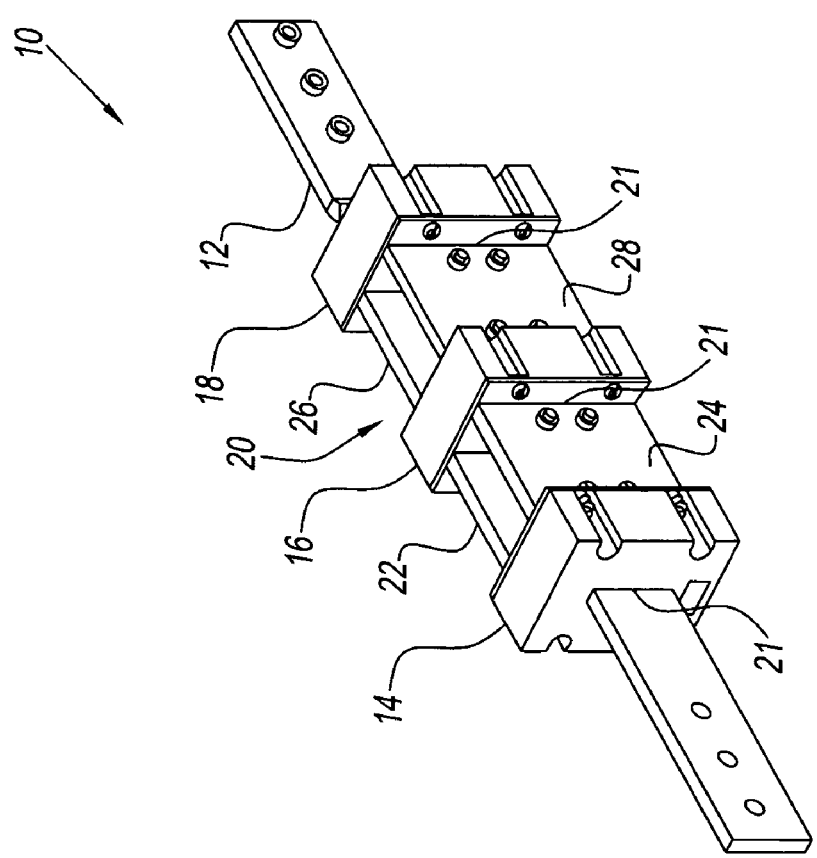
FIG. 1 is a side perspective view of an exemplary embodiment of a ferrite assembly.

With reference to FIG. 1, there is provided a ferrite assembly 10 for a power converter being generally represented as reference numeral 10. The ferrite assembly 10 finds use with a current carrying conduit 12. In an embodiment, the current carrying conduit 12 is a power bus bar. One skilled in the art should appreciate that the current carrying conduit 12 may be any wire, cable or power converter being known in the art and that the current carrying conduit may have any size and shape that is known in the art. In an embodiment, the current carrying conduit 12 is rectangular in shape and is 2 inches in length by ⅜ inches in width.

A feature of the current carrying conduit 12 is that a current traverses through the current carrying conduit. In an embodiment, the current may be relatively large, such as in a range that includes 3476 amps of direct current. It has been observed that when a sufficiently large current traverses through the current carrying conduit 12 a number of effects occur that could potentially be detrimental to an application using the current carrying conduit. These effects include an amount of heat and a magnetic field being generated by the current traversing therethrough. The amount of heat and the magnetic field may damage, disrupt and/or otherwise disturb other components that are in close proximity to the current carrying conduit 12.

The ferrite assembly 10 of the present disclosure remedies this deficiency while maintaining the current carrying conduit 12 and the ferrite system 10 in a compact form. The ferrite system 10 has a first ferrite member 14, a second ferrite member 16, and a third ferrite member 18. The first, second, and third ferrite members 14, 16, 18 are substantially rectangular in shape. Each ferrite member has a core 21 being disposed in a centermost portion of the respective ferrite member. Although, the first ferrite, second ferrite, and third ferrite members 14, 16, 18 are illustrated as being rectangular, one skilled in the art should appreciate that these may be any shape known in the art including circular, triangular, diamond shaped, or any other configuration. The core 21 permits the first current carrying conduit 12 access through the ferrite assembly 10. In this manner, the first ferrite member 14, a second ferrite member 16, and a third ferrite member 18 are all in contact with the first current carrying conduit 12 to provide inductance and reduce a magnetic field generated by the current traversing through the first current carrying conduit 12. The ferrite assembly 10 provides inductance. This inductance reduces an initial rate of change of current traversing through any current carrying conduit, for example the first current carrying conduit 12, or a power semi-conductor (not shown). In this manner, the ferrite assembly 10 protects the first current carrying conduit 12 and any other power devices being connected thereto.

The ferrite assembly 10 further has a number of current dividing members being generally represented by reference numeral 20. The current dividing members 20 reduce the heat generated by the current traversing through the first current carrying conduit 12 and also allows for the first current carrying conduit 12 to have a compact form. The current dividing members 20 are a second current carrying conduit 22, a third current carrying conduit 24, a fourth current carrying conduit 26, and a fifth current carrying conduit 28. One skilled in the art should appreciate that due to the "AC skin effect" a majority of the current traversing through the first current carrying conduit 12 is carried in an outermost conducting surface of the first current carrying conduit 12 to the current dividing members 20.

The second current carrying conduit 22 is disposed above the first current carrying conduit 12. The third current carrying conduit 24 is disposed below the first current carrying conduit 12 and the second current carrying conduit 22. The fourth current carrying conduit 26 is disposed above the first current carrying conduit 12. The fifth current carrying conduit 28 is disposed below the first current carrying conduit 12 and the fourth current carrying conduit 26. Of course, as will be apparent the second current carrying conduit 22, the third current carrying conduit 24, the fourth current carrying conduit 26, and the fifth current carrying conduit 28 may be placed in any location around the first current carrying conduit 12 to dissipate heat.

The second current carrying conduit 22, the third current carrying conduit 24, the fourth current carrying conduit 26, and the fifth current carrying conduit 28 may be formed from a copper material, an aluminum material or any other conductive material being known in the art. The second current carrying conduit 22, the third current carrying conduit 24, the fourth current carrying conduit 26, the fifth current carrying conduit 28 each has a height of four inches and a length of 3.1 inches. Of course, one skilled in the art should appreciate that the current carrying conduits may have different heights, lengths, and sizes relative to one another.

In another embodiment, each current carrying conduit may have a 2-inch height and a 7.3-inch length. In another embodiment, each current carrying conduit may have a 3-inch height and a 4.6-inch length. In still another embodiment, each current carrying conduit may have a 5-inch height and a 2.1-inch length. In still yet another embodiment, each current carrying conduit may have a 6-inch height and a 1.6-inch length. Of course, one skilled in the art should appreciate that each current carrying conduit of the current dividing members 20 may have any height and length to dissipate heat.

Figure 2:
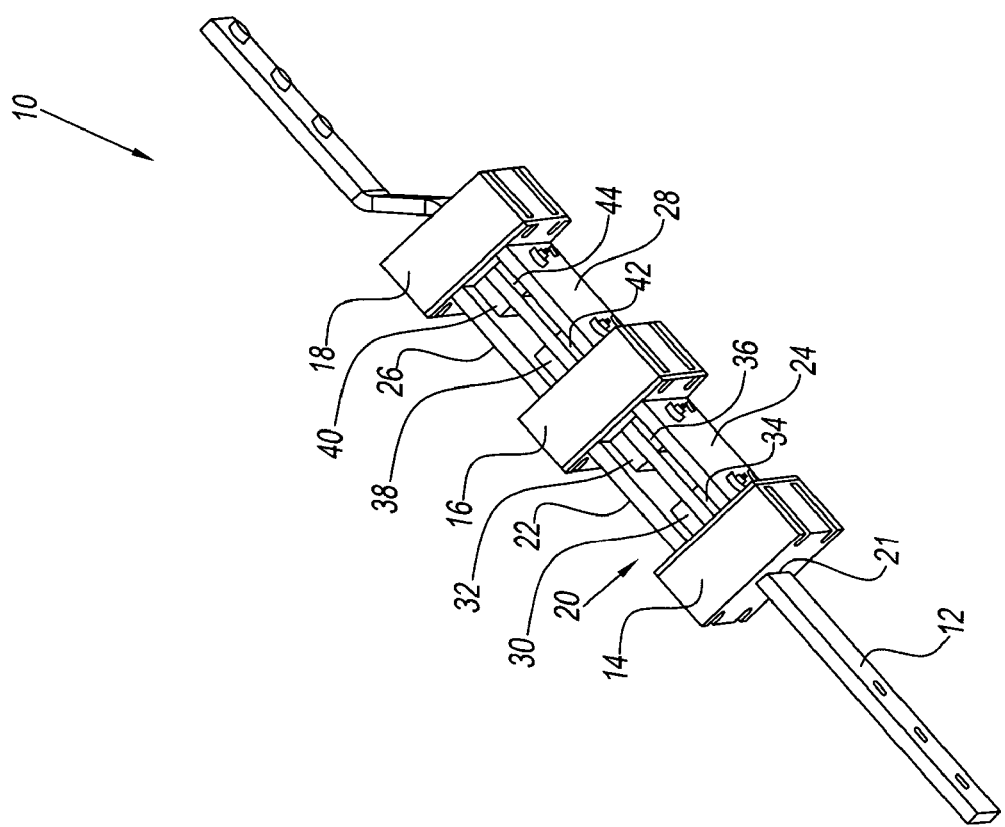
FIG. 2 is top perspective view of the ferrite assembly of FIG. 1.
Figure 3:
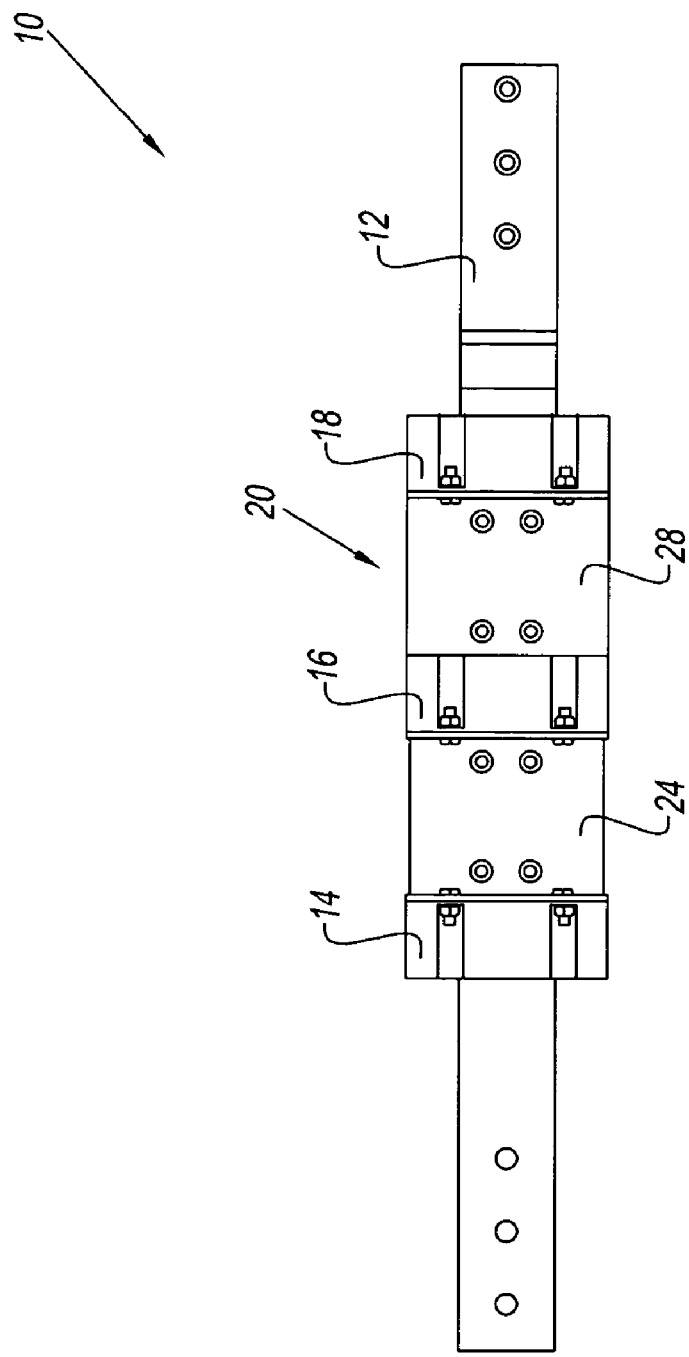
FIG. 3 is a side view of the ferrite assembly of FIG. 1.
Figure 4:
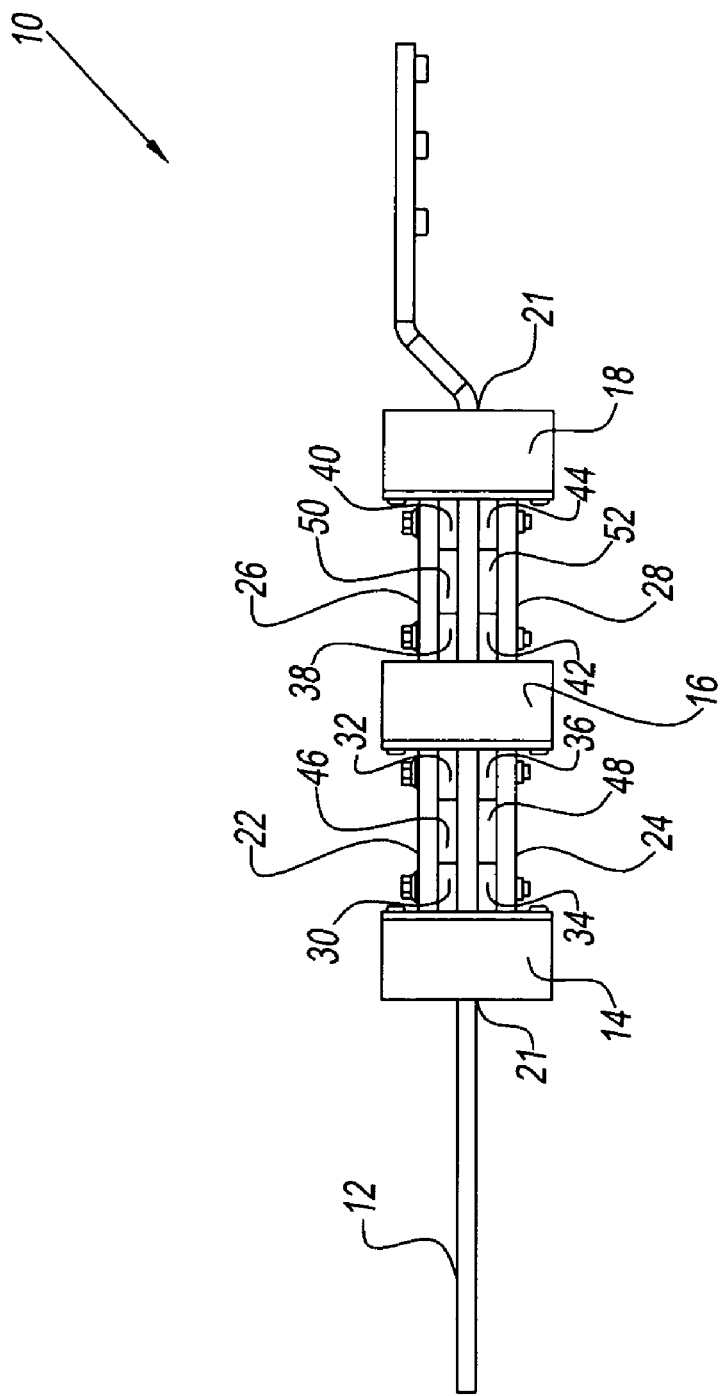
FIG. 4 is a top view of the ferrite assembly of FIG. 1.

Referring to FIGS. 2 and 3, as can be understood from the drawings, a first spacer 30 and a second spacer 32 is connected between the second current carrying conduit 22 and the first current carrying conduit 12. Also a third spacer 34 and a fourth spacer 36 are disposed between the third current carrying conduit 24 and the first current carrying conduit 12. Likewise, a fifth spacer 38 and a sixth spacer 40 are disposed between the fourth current carrying conduit 26 and the first current carrying conduit 12. A seventh spacer 42 and an eighth spacer 44 are disposed between the fifth current carrying conduit 28 and the first current carrying conduit 12.

In this manner, current traverses through the first current carrying conduit 12 to the second current carrying conduit 22, the third current carrying conduit 24, the fourth current carrying conduit 26, and the fourth current carrying conduit 28 back to the first current carrying conduit 12. This allows the current dividing members 20 to carry a portion of the current to reduce an overall length of the first current carrying conduit 12. This allows the first current carrying conduit 12 to fit inside a relatively smaller cabinet relative to prior art power converters that carry equivalent current load.

The ferrite assembly 10 further has a number of passageways or a first aperture 46, a second aperture 48, a third aperture 50, and a fourth aperture 52. One of the aspects of the present disclosure is that the current dividing members 20 form the number of passageways to dissipate any heat generated by the current traversing through the current dividing members, the first current carrying conduit 12, and any combinations thereof. The first aperture 46, a second aperture 48, a third aperture 50, and the fourth aperture 52 are all generally orthogonal in shape and permit an air flow to traverse therethrough and cool the first current carrying conduit 12. Of course, one skilled in the art will appreciate that the first spacer 30, the second spacer 32, the third spacer 34, the fourth spacer 36, the fifth spacer 38 and the sixth spacer 40 may be any shape known in the art. These shapes include but are not limited to circular, triangular, pyramid shaped or any other shape to form any sized aperture to allow airflow to traverse therethrough. Of course, one skilled in the art will appreciate that the first spacer 30, the second spacer 32, the third spacer 34, the fourth spacer 36, the fifth spacer 38 and the sixth spacer 40 may be formed from any material known in the art, or each may be formed of different materials. For example, the first spacer 30, the second spacer 32, the third spacer 34, the fourth spacer 36, the fifth spacer 38 and the sixth spacer 40 may be a copper material, an aluminum material, a conductive material, or any combinations thereof. In an embodiment, the airflow travels at a speed of 300 feet per minute. An airflow speed depends upon an amount of available air depending upon the location of the ferrite assembly 10. However, one skilled in the art will appreciate that any speed suitable to cool the ferrite assembly 10 may be used with ferrite assembly 10.

Although the ferrite assembly 10 may be used with any current flowing conduit known in the art, the ferrite assembly is illustrated as being provided in a compound source excitation system or exciter that has a power current transformer being coupled to a generator. The generator generates at least a three phase(3Φ) power source.

The present disclosure having been thus described with particular reference to the preferred forms thereof, it will be obvious that various changes and modifications may be made therein without departing from the spirit and scope of the present disclosure as recited in the claims.

What is claimed is:

1. A ferrite assembly comprising:
   a first conductor;
   a plurality of ferrite members each having a core in contact with said first conductor so that said plurality of ferrite members provide inductance and reduce a magnetic field generated by current traversing through said first conductor; and
   a plurality of current dividing members being in electrical communication with said first conductor so that at least a portion of said current traversing through said first conductor is conducted through said plurality of current dividing members, wherein said plurality of current dividing members define a plurality of passages allowing an airflow therethrough.

2. The ferrite assembly of claim 1, wherein said plurality of current dividing members are disposed on a location being selected from the group consisting of a first side of said first conductor, a second side of said first conductor, and any combinations thereof.

3. The ferrite assembly of claim 1, wherein said plurality of current dividing members are a material being selected from the group consisting of a copper material, an aluminum, a conductive material, and any combinations thereof.

4. A ferrite assembly comprising:
a first conductor;
a plurality of ferrite members each having a core in contact with said first conductor so that said plurality of ferrite members provide inductance and reduce a magnetic field generated by current traversing through said first conductor;
a plurality of current dividing members being in electrical communication with said first conductor so that at least a portion of said current traversing through said first conductor is conducted through said plurality of current dividing members, wherein said plurality of current dividing members define a plurality of passages allowing an airflow therethrough; and
a plurality of spacers, said plurality of spacers being disposed between said plurality of current dividing members and said first conductor.

5. The ferrite assembly of claim 4, wherein said plurality of spacers are a material being selected from the group consisting of a copper, material, an aluminum, a conductive material, and any combinations thereof.

6. The ferrite assembly of claim 1, wherein said first conductor has a length, one of said plurality of ferrite members being disposed at a first location, and another of said plurality of ferrite members being disposed at a second location, and wherein said plurality of current dividing members are disposed between said first location and said second location in electrical communication with said plurality of ferrite members.

7. A ferrite assembly comprising:
a first conduit having a first longitudinal axis;
a first ferrite member and a second ferrite member surrounding said first conduit about said first longitudinal axis, said first and said second ferrite members being in contact with said first conduit so that said first and second ferrite members provide inductance and reduce a magnetic field generated by current traversing through said first conduit;
a second conduit being disposed parallel to a first side of said first conduit;
a first spacer material placing said first and second conduits in electrical communication so that a first aperture is defined therebetween;
a third conduit being disposed parallel to a second side of said first conduit;
a second spacer material placing said first and said third conduits in electrical communication so that a second aperture is defined therebetween, wherein said current traversing through said first conduit communicates with said second conduit, said first spacer material, said third conduit so that said first and said second apertures define a cooling path.

8. The ferrite assembly of claim 7, wherein said first ferrite member limits a rate of change of said current in said first current carrying conduit, said second current carrying conduit, and said third current carrying conduit, and wherein the ferrite assembly limits power across a component being in electrical communication with said first current carrying conduit, said second current carrying conduit, and said third current carrying conduit.

9. The ferrite assembly of claim 7, wherein said first, second, and third conduits are formed from a material being selected from the group consisting of a copper, an aluminum, a conductive material, and any combinations thereof.

10. The ferrite assembly of claim 7, wherein said second conduit is disposed between said first ferrite member and said second ferrite member on said first side, and wherein said third conduit is between said first ferrite member and said second ferrite member on said second side.

11. The ferrite assembly of claim 10, further comprising a fourth conduit, a fifth conduit, and a third ferrite member, said third ferrite member being in electrical communication with said first conduit, said third ferrite member surrounding said first conduit about said first longitudinal axis.

12. The ferrite assembly of claim 11, wherein said fourth conduit is disposed in a third position being parallel to said first longitudinal axis.

13. The ferrite assembly of claim 12, wherein said fifth conduit is disposed in a fourth position being parallel to said first longitudinal axis.

14. The ferrite assembly of claim 13, further comprising a third spacer material being connected between said fourth conduit and said first conduit.

15. The ferrite assembly of claim 14, further comprising a fourth spacer material being connected between said fifth conduit and said first conduit.

16. The ferrite assembly of claim 15, wherein said third spacer material places said first and fifth conduits in electrical communication so that a third aperture is defined therebetween, said third aperture defining a second cooling path.

17. The ferrite assembly of claim 16, wherein said fourth spacer material places said first and said fourth conduits in electrical communication so that a fourth aperture is defined therebetween, said fourth aperture defining a third cooling path.

18. The ferrite assembly of claim 17, wherein said fourth and fifth conduits are formed from a material being selected from the group consisting of a copper, an aluminum, a conductive material, and any combinations thereof.

19. The ferrite assembly of claim 18, wherein said fourth conduit is between said second ferrite member and said third ferrite member in said third position, and wherein said fifth conduit is between said second ferrite member and said third ferrite member in said fourth position.

20. A ferrite assembly comprising:
a first conductor;
a plurality of current dividing members being in electrical communication with said first conductor so that at least a portion of current traversing through said first conductor is conducted through said plurality of current dividing members, wherein said plurality of current dividing members define a plurality of passages allowing an airflow therethrough; and
a plurality of ferrite members surrounding said first conductor and said plurality of current dividing members so that said plurality of ferrite members provide inductance and reduce a magnetic field generated by said current traversing through said first conductor and said plurality of current dividing members.

* * * * *